United States Patent
Lee (10) Patent No.: US 8,121,614 B2
(45) Date of Patent: Feb. 21, 2012

(54) APPARATUS AND METHOD USING RADIO SIGNALS

(75) Inventor: Jung-Hwan Lee, Middlesex (GB)

(73) Assignee: Samsung Electronics Co., Ltd (KR)

( * ) Notice: Subject to any disclaimer, the term of this patent is extended or adjusted under 35 U.S.C. 154(b) by 256 days.

(21) Appl. No.: 12/397,701

(22) Filed: Mar. 4, 2009

(65) Prior Publication Data

US 2009/0227271 A1 Sep. 10, 2009

(30) Foreign Application Priority Data

Mar. 4, 2008 (GB) .................................. 0804013.1

(51) Int. Cl.
*H04M 1/00* (2006.01)
(52) U.S. Cl. ...................................... 455/456.1; 455/522
(58) Field of Classification Search ........................ None
See application file for complete search history.

(56) References Cited

U.S. PATENT DOCUMENTS

| 6,731,940 | B1* | 5/2004 | Nagendran ................. 455/456.1 |
| 2005/0182847 | A1* | 8/2005 | Jawad Pirzada et al. ..... 709/233 |
| 2005/0260989 | A1* | 11/2005 | Pourtier et al. ............. 455/435.3 |
| 2008/0049675 | A1* | 2/2008 | Burgan et al. .................. 370/331 |
| 2008/0293367 | A1* | 11/2008 | Wulff et al. ................... 455/90.3 |

FOREIGN PATENT DOCUMENTS

EP 1 670 265 6/2006

* cited by examiner

*Primary Examiner* — Ajit Patel
(74) *Attorney, Agent, or Firm* — The Farrell Law Firm, P.C.

(57) ABSTRACT

A method of using radio signals transmitted for reception by mobile user equipment that includes receiving, with mobile user equipment (UE), radio signals having at least one format; monitoring, with the mobile user equipment, at least one property of the received radio signals; identifying a pattern in said monitored property or properties; and in response to identifying said pattern, triggering at least one action according to the identified pattern, and/or providing the UE with an indication of a location of the UE based at least part of the identified pattern.

16 Claims, 3 Drawing Sheets

APPARATUS AND METHOD USING RADIO SIGNALS

PRIORITY

This application claims priority under 35 U.S.C. §119(a) to an application entitled "Apparatus and Method Using Radio Signals" filed in the United Kingdom Intellectual Property Office on Mar. 4, 2008 and assigned Serial No. 0804013.1, the contents of which are hereby incorporated by reference.

BACKGROUND OF THE INVENTION

1. Field of the Invention

The present invention relates to a method of using radio signals transmitted for reception by mobile user equipment and to systems and apparatus implementing or using such a method.

2. Background to the Invention

A wide variety of electronic mobile user equipment is known for receiving radio signals for a wide variety of purposes. Such mobile User Equipment (UE) includes mobile phones (which may also be referred to as cell phones or handsets), Personal Digital Assistants (PDAs), Global Navigation Satellite System (GNSS) receivers, and other equipment. It will be appreciated that in addition to being able to receive one or more formats of transmitted radio signals, certain examples of known UEs are also able to transmit radio signals. This is of course the case with mobile phones for use in a telecommunication system. Similarly, devices such as PDAs are able to transmit radio signals in order to exchange data with other equipment. Also, in addition to dedicated GNSS receivers, GNSS receiver functionality can also be incorporated in mobile user equipment having other functions, for example a mobile phone having the capability to determine its location using GNSS signals. It is also known for user equipment to be able to receive and process radio signals of different formats from a corresponding plurality of transmitters arranged at terrestrial locations. For example, it is known for a mobile handset to be able to receive and send mobile telephone signals in Global System for Mobile communications (GSM) and/or Universal Mobile Telecommunications System (UMTS) or UMTS Terrestrial Radio Access Network (UTRAN) systems, in addition to being able to send and receive Wireless Local Area Network (WLAN) signals for shorter range communication.

Such user equipment can also provide an alarm function. However, this alarm function is typically arranged such that the alarm is triggered according to time only (that is, the alarm will be triggered at the set time, irrespective of where the user equipment is located or what the user of the equipment is doing or has been doing).

In the case of user equipment with the ability to determine its location from GNSS signals, a known problem is that in certain locations the availability of such signals is restricted (and indeed no such signals may be available) and then the device is unable to continue determining its location.

It is also known for users to be able to manually change or update the profile or configuration of their mobile user equipment.

Certain embodiments of the present invention aim to provide improved methods of using radio signals transmitted for reception by mobile user equipment, and improved apparatus and improved user equipment. Certain embodiments aim to provide methods and apparatus which overcome, at least partially, one or more of the problems or disadvantages associated with the prior art.

SUMMARY OF THE INVENTION

According to a first aspect of the present invention there is provided a method of using radio signals transmitted for reception by mobile user equipment, the method includes receiving, with mobile user equipment, radio signals having at least one format; monitoring, with the mobile user equipment, at least one property of the received radio signals; identifying a pattern in said monitored property or properties; and in response to identifying said pattern, performing at least one of triggering at least one action according to the identified pattern; and providing with the UE an indication of a location of the UE based at least in part on the identified pattern.

Thus, in this method radio signals intended for reception are used by mobile user equipment in new ways, i.e. for additional purposes. For example, the radio signals being received by the user equipment may be telecommunications signals in GSM, UMTS, UTRAN, or Evolved-UTRAN (E-UTRAN) systems and will typically include information relating to audio or data content. The user equipment will typically be adapted to process these received signals in the usual way for the normal purposes, but additionally may monitor and respond to observed patterns in some property of the received signals, such as the received signal strength. For example, a sudden or abrupt reduction in received signal strength may correspond to the user equipment being taken inside a building. The method may be arranged to identify this pattern (i.e. change) and trigger some action in accordance with the change. For example, the UE may be arranged to turn off or power down its GPS receiver when it sees a sharp drop in GSM phone signal strength indicative of entry into a building. In certain embodiments the user equipment is adapted to receive a plurality of radio signals in plurality of formats. Generally, the method is able to monitor parameters of those received signals and from those observed patterns derive information (such as location information).

In certain embodiments the received radio signals include radio signals transmitted from at least one transmitter located at a terrestrial location. In certain embodiments these radio signals include radio signals transmitted from a plurality of terrestrial transmitters in plurality of signal formats.

Additionally, the received radio signals may include signals transmitted from at least one Space Vehicle (SV). Thus, in examples where the user equipment is adapted to receive GPS signals, the UE can process the received signals in the usual way to determine its location, but additionally, by monitoring properties of the GPS signals (for example received signal strength) and identifying patterns in those measured properties, the UE or some other apparatus interacting with the UE can derive further information for use in location determination or for other purposes.

In certain embodiments the pattern includes at least one of a temporal pattern, a chronological pattern, a static pattern, an instantaneous pattern, and a dynamic pattern. Thus, the pattern can include combinations of measured properties of a plurality of different received radio signals at a particular time or location and/or may include patterns of changes in measured properties over time. For example, a particular combination of received signal strengths may form part of a pattern which indicates a user of the user equipment is at, or close to, home. The pattern may also include an abrupt change in signal strength of one type of received signal. When that combination of signal strengths is observed together with an abrupt drop in signal strength of another signal, such as a GPS signal, this can be used as an indication that the user is not just at or close to home but has actually entered their house. Similarly, when the combination of received signal strengths is observed together with a sudden increase in strength to the GPS signal this can be used as an indication that the user has just stepped out of their house. Clearly, there are a wide variety of ways in which the embodiments of the invention can monitor patterns in properties of received signals and use those patterns as indications of location and/or movement.

Thus, in certain embodiments the pattern being identified includes a change in at least one monitored property of at least one received radio signal.

Additionally, the pattern may include an instantaneous combination of monitored properties of a plurality of different received radio signals (i.e. in different formats, such as GSM, GPS, WLAN, etc).

In certain embodiments the at least one property can include a BLock Error Rate (BLER), a Bit Error Rate (BER), a Received Signal Strength Indicator (RSSI), a Common PIlot CHannel Received Signal Code Power (CPICH RSCP), and/or an SV power.

In certain embodiments the method further includes monitoring, using the mobile user equipment, information contained in the received radio signals. This information may be used in conjunction with the information derived from observing patterns in monitored parameters to provide improved location determination and/or other functionality.

In embodiments in which the user equipment is used to monitor information contained in the received radio signals, the pattern being identified (i.e. being looked for) may also include one or more patterns in the contained information, together with one or more patterns in the monitored signal parameters. For example, the user equipment may be arranged to receive mobile telephone signals and at certain locations will be able to receive those radio signals from a corresponding plurality of base stations. The signal from each base station may include information indicative of the identity of that base station. Thus, the user equipment may, in addition to being able to monitor received signal strengths, look at the information contained in the received signals and identify from which combination of base stations the user equipment is receiving signals from at that location. A particular combination of base stations may correspond to a particular location, such as the user's home or workplace. Thus, the method can derive some location information from the information contained in the received radio signals. Additionally, the user equipment may look for a pattern of change in a measured parameter (such as a rapid or abrupt change in the received strength of a GPS signal) which, together with the combination of base stations at a particular location, is able to indicate whether the user is arriving at or leaving home or work.

In certain embodiments, the information includes a neighboring cell IDentifier (ID) list, a base station identity code, a Subscriber Trunk Dialing (STD) code or region or area code, a service set identifier, a time and/or a date, a GPS day of week, and/or a multipath indication.

In certain embodiments the identifying step includes processing the results of the monitoring into a particular data format, and then comparing the results in that format with data stored in a memory. Additionally, the method may further include using the results (processed into the particular format) to update the stored data. Thus, the system may be able to identify and "learn from" patterns observed from monitoring signal parameters (and the information they contain).

In certain embodiments the at least one action triggered (i.e. carried out) in response to identifying a particular pattern includes providing (from the mobile user equipment) a signal for a user of the equipment, changing a configuration of the user equipment or external apparatus, switching the user equipment between one operational mode and another, and/or switching an apparatus external to the user equipment between one operational mode and another. Other actions may of course be performed in alternative methods embodying the invention.

An example of a signal which the mobile user equipment may provide to a user is an alarm signal. Others include a reminder signal, a location signal, an audible signal and a visual signal. Thus it will be appreciated that certain embodiments of the invention may identify (recognize) a particular pattern involving parameters of radio signals received by the user equipment as a person carries that equipment around, and according to that observed pattern can provide a useful signal such as an alarm or a reminder. In contrast to alarm signals or reminders provided by prior art systems, which in general could only issue a reminder or alarm at a particular set time, irrespective of where the user was, embodiments of the invention are thus able to use the observed patterns to provide a more sophisticated alarm or reminder functionality. As mentioned above, embodiments of the invention may be arranged to spot when a user leaves home with the user equipment (by appropriate monitoring of radio signal parameters) and issue a reminder signal, for example, to the user regarding something he or she should do on the way to work. Thus, the reminder can be issued at a truly appropriate time, rather than simply at a notional set time at which the user expects to be leaving for work.

An example of switching the user equipment between one operational mode and another is where the user equipment comprises a GPS or other GNSS receiver and in one operational mode this receiver is operated at a first level of power consumption, and in the other operational mode it is operated at a reduced power level (or even switched off entirely). Thus, in certain embodiments of the invention observed patterns in signal properties could be used to save power by at least partially switching off a GPS receiver when the observed patterns are indicative of the user being in a location where location determination from GNSS signals will not be possible.

An example of switching an external apparatus from one operational mode to another is where an observed pattern is used to switch on an apparatus only when it indicates that a user has entered a particular environment, such as switching on a television or other display unit or switching on lights when a user arrives at his or her office or home. Another example would be where user equipment in the form of a mobile phone is arranged to hand over its display function to a television when a user arrives at work or home.

According to a second aspect of the invention there is provided apparatus (which may also be described as a system) that includes mobile User Equipment (UE) arranged to receive radio signals having at least one format and includes monitoring means arranged to monitor at least one property of the received radio signals; pattern identification means arranged to identify a pattern in said monitored property or properties; and response means arranged to perform, in response to the pattern identification means identifying said pattern, triggering at least one action according to the identified pattern; and/or providing the UE an indication of a location of the UE based at least in part on the identified pattern.

In certain embodiments the UE is arranged to receive radio signals transmitted from at least one transmitter located at a terrestrial location. Additionally, the UE may be arranged to receive radio signals transmitted from at least one Space Vehicle (SV).

In certain embodiments, the pattern being identified or recognized includes a temporal pattern, a chronological pattern, a static pattern, an instantaneous pattern, and/or a dynamic pattern.

For example, in certain embodiments a pattern which may be recognized includes a change in at least one monitored property of at least one received radio signal. Additionally, the pattern may include an instantaneous combination of monitored properties of a plurality of different received radio signals.

In certain embodiments the at least one property includes a received signal strength or power of a received radio signal.

In certain embodiments the at least one property includes a BLock Error Rate (BLER), a Bit Error Rate (BER), a Received Signal Strength Indicator (RSSI), a Common PIlot CHannel Received Signal Code Power (CPICH RSCP), and/or an SV power.

In certain embodiments the UE is further arranged to monitor information contained in the received radio signals. Then, the pattern identification means may be adapted to identify a pattern or patterns including a pattern in said information. The information may, for example, include a neighboring cell ID list, a Base Station Identity Code (BSIC), a Subscriber Trunk Dialing (STD) code or region (i.e. area) code, a Service Set IDentifier (SSID), a time and/or a date, a GPS day of week, and/or a multipath indication.

In certain embodiments, the apparatus or system further includes processing means arranged to process data from the monitoring means (that data being indicative of the at least one property of the received radio signals) into a predetermined data format. In certain embodiments the UE includes this processing means, although in alternative embodiments the processing means may be provided external to the UE, with the UE being adapted to transmit monitoring data to the processing means for processing.

In certain embodiments the pattern identification means is arranged to compare the data processed into said predetermined format with data stored in a memory or database. This database may be provided in the UE, or alternatively may be provided at a different location. For example, the database may be provided in a communication system or network arranged to communicate with the UE.

In certain embodiments the apparatus further includes data updating means arranged to update the stored data using the data processed into the predetermined format. In other words, the processed data relating to observed signal properties could be used to modify/update the stored data. The database can thus evolve.

The action triggered/performed in response to the identification of a pattern in the observed signal property or properties may, for example, include providing from the mobile user equipment a signal for a user of the equipment; changing a configuration of the user equipment or external apparatus; switching the user equipment between one operational mode and another; and/or switching apparatus external to the user equipment between one operational mode and another. It will be appreciated that the triggering of an action may, in certain examples, include the UE transmitting a signal (e.g. a radio signal from suitable transmission means) for reception by other apparatus. This other apparatus may form part of the apparatus/system as a whole. For example, in response to the UE detecting a signal pattern indicative of the user approaching or entering home, the UE may transmit a signal to suitably arranged reception means in the home to turn on lights, turn on heating, switch certain apparatus into standby mode etc.

In certain embodiments the UE includes the pattern identification means, although in alternative embodiments the pattern identification means may be provided elsewhere in the system (i.e. external to the UE). Similarly, the UE may include the response means, although in alternative embodiments the response means may be external (for example a communication network adapted to communicate with the UE may perform the action or actions in response to detection/recognition/identification of a particular pattern in received signal properties.

Another aspect of the invention provides mobile user equipment (UE) including signal reception means arranged to receive radio signals having at least one format; monitoring means arranged to monitor at least one property of the received radio signals; and pattern identification means arranged to identify a pattern in said monitored property or properties, wherein the UE is arranged to respond to the pattern identification means identifying said pattern by performing triggering at least one action according to the identified pattern, and/or providing an indication of a location of the UE based at least in part on the identified pattern.

It will be appreciated that optional features of the other aspects of the invention described above may also be incorporated in UEs in accordance with this third aspect, with corresponding advantage. Accordingly, a description of those features will not be repeated here.

BRIEF DESCRIPTION OF THE DRAWINGS

Embodiments of the invention will now be described with reference to the accompanying drawings, of which.

DETAILED DESCRIPTION OF EMBODIMENTS OF THE INVENTION

Preferred embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention.

It will be appreciated from the above description and from the description below that certain embodiments of the invention may be described as location edge and zone detection methods based on radio signals and user behavior. An area to which certain embodiments of the invention applies is the UMTS or GSM radio interface in a mobile phone.

Certain embodiments provide the advantage that they are able to provide cost-effective location information so that a user can use this for precise reminder/alarming, position tracking and profile or configuration changes. This is in contrast to prior art reminder/alarm systems in which triggering of an event reminder was based on time-line information only.

Certain embodiments may also be used for asset or user tracking applications, and provide advantages over prior art systems limited to use either outdoors, or requiring extra equipment and components, such as Radio Frequency IDentification (RFID) tags for indoor use.

Certain embodiments are also able to provide the advantage of automated profile and/or configuration changes in response to detected signal patterns, in contrast to prior art systems asking users to change the profile or configuration directly and manually.

Certain embodiments, by identifying patterns involving the combination of time information and location signal patterns, are able to increase the accuracy and reliability of position estimation.

Embodiments may be implemented without requiring extra hardware for indoor use, and so implementation may be cost-effective and realized in a typical mobile phone. The UE may include one or more radio signal interfaces such as WLAN, GPS or GSM/UMTS, and in certain embodiments the method or system utilizes the best available information (e.g. can use all of the available signals/signals received) from measurements to provide reliable location edge or zone information.

It will be appreciated that information may be derived from measurements on radio signals received by a mobile UE. A position of the mobile UE and/or a behavior of a user can be determined (at least to some degree) by analyzing the received signal patterns along with previous parameter history. For example, by monitoring properties of received radio signals one can determine: If the mobile device is indoors or outdoors; if the mobile device is at a user's home, office or a certain place that he/she visited before (i.e. if the UE is at or in a "zone"); and/or if the mobile is entering or moving out of the zone.

For example, in an urban home environment, whether the UE is in a living room or at the door, the list of IDs of surrounding BSs and the area codes from each are usually the same (one may lose some weak BS signals from time to time). However, the RSSI and the multipath propagation values are substantially changed when the mobile equipment (UE) moves from indoors to outdoors. In that case, the UE itself (or some other component of a system incorporating the UE) can record the observed (i.e. measured) pattern of signals and their changes. Then, whenever this pattern is observed, the UE can report to an alarm or reminder system to be linked with time-driven event trigger system.

It will be appreciated that the pattern of radio frequency (RF) signals received by a UE is influenced, in the sense that it varies, by various factors including moving cars and other UEs camped on the base station (BS), and the certainty of triggering can be improved when the triggering is linked with (i.e. used in conjunction with) time information, and Cell-ID and STD code.

Various properties of radio signals may be monitored in embodiments of the invention, and a variety of information may be extracted from those radio signals. Examples of such properties and information, which are monitored and used in embodiments of the invention, are shown in the following table. Table 1 indicates the technology (air interface and sub interface) to which each property or information that can be monitored relates.

TABLE 1

| Air Interface | Sub Interface | Information of Interest | Reference |
|---|---|---|---|
| Cellular | GSM | BLER (Block Error Rate), BER (Bit Error Rate), RSSI (Received Signal Strength Indicator) Neighbor Cell ID List, BSIC (Base Station Identity Code), STD Code/Region Code in CB (Cell Broadcast) | 3GPP |
| | UMTS | CPICH RSCP (Common Pilot Channel, CPICH Eb/N0 | 25.331 (RRC), 25.215 (PHY Measurements) |
| WLAN | WLAN | SSID, RSSI | IEEE 802.11 |
| GPS | GPS | SV Power in dBm, Satellites Visible, Time & Date (GWT) | |
| | AGPS | GPS TOW (Time of Week), Multipath Indicator | 3GPP |

For mobile UE adapted for use in GSM/UMTS systems, occasionally a mobile is requested by the cellular network to monitor neighboring BS signals, especially broadcasting channels or pilots. By monitoring this type of signal the UE can typically determine: the ID (identity) of each BS, which is Cell-ID or BSIC; Signal Strength, typically RSSI; and/or Optional: STD (Subscriber Trunk Dialing) Area Code.

Depending on the location and the traffic of the BS, observations of received signal properties can show certain patterns which can be used to make a determination about the location of the UE.

In certain embodiments, the UE is operable in a WLAN. To camp on an Access Point (AP), the mobile should typically monitor neighboring APs, monitoring the SSID contained in, and the signal strength of the received signal from each.

In certain embodiments, the UE is operable in at least one GNSS system, e.g. GPS. To calculate its position, the mobile (UE) tries to acquire satellite signals and the UE returns (i.e. measures/monitors) received signal power in dBm and the number of satellites currently visible (with the corresponding satellite identity number). Additionally, if Assisted GPS (AGPS) service is provided by the cellular network, the mobile can get extra information such as a multipath indicator.

Figure 1:
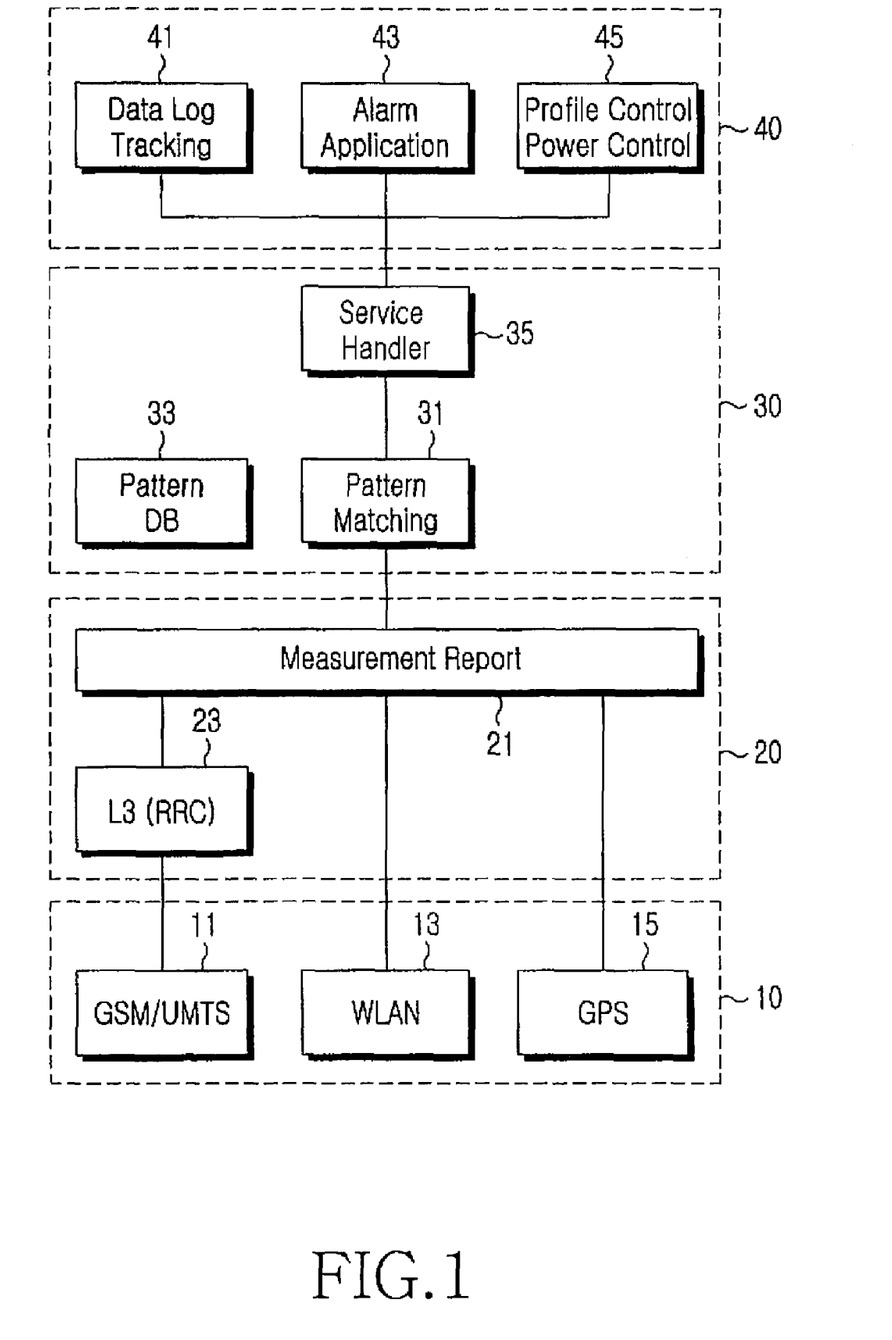
FIG. 1 is a block diagram illustrating an embodiment of the present invention.

A system according to an embodiment of the present invention will now be provided, with reference to FIG. 1. The core system has 2 parts: a measurement part (20) and decision-making part (30). Modems (10), which may include Radio Frequency (RF) modem, of various radio receivers provide useful measurement in a predefined report format. For example, the modems (10) may include a GSM/UMTS signal processing module (11) for transmitting and receiving radio signals based on a GSM or UMTS protocol, a WLAN signal processing module (13) for transmitting and receiving radio signals based on a WLAN protocol, and a GPS signal processing module (15) for transmitting and receiving GPS signals.

The measurement part (20) includes a measurement report unit (21) which extracts information to be used by an application processor (40) from signals provided from the modems (10) and provides the extracted information to the decision-making part (30). For example, the measurement part (20) may extract related information disclosed in Table 1 and provide the extracted information to the decision-making part (30).

The decision-making part (30) includes a pattern matching unit (31), a pattern database (DB) (33), and a service handler (35). The pattern matching unit (31), by comparing the previous patterns stored in the pattern database (DB) (33), can make a decision or generate triggering events provided to the service handler (35). The role of the service handler (35) is to interface various application processors (40) or customers—capturing what triggering event they want, and generating the trigger when certain criteria are satisfied.

The application processor (40) is a device implemented to execute an application, and executes an application based on an environment being set by a user or a designer. The application processor (40) also executes an application based on an event generated by the decision-making part (30). For example, the application processor (40) may include processors 41, 43, and 45 which process an application for tracking data log information, an alarm application, an application for executing profile or power control, etc.

To minimize the engineering work, in UMTS/GSM, rather than extracting the measurement report from the physical layer Layer 1, measurement reports from Layer 3 (L3) such as a Radio Resource Controller (RRC) (23) are more desirable. This information should be produced for the cellular network anyway, and thus does not require any extra function or processing in the mobile device.

Operation of the system embodying the invention will now be described in more detail. A summary of operation is provided in the flow chart of FIG. 2. Further information regarding the function of the service handler (35), sub flow of training mode or triggering criteria, are to be found below.

Figure 2:
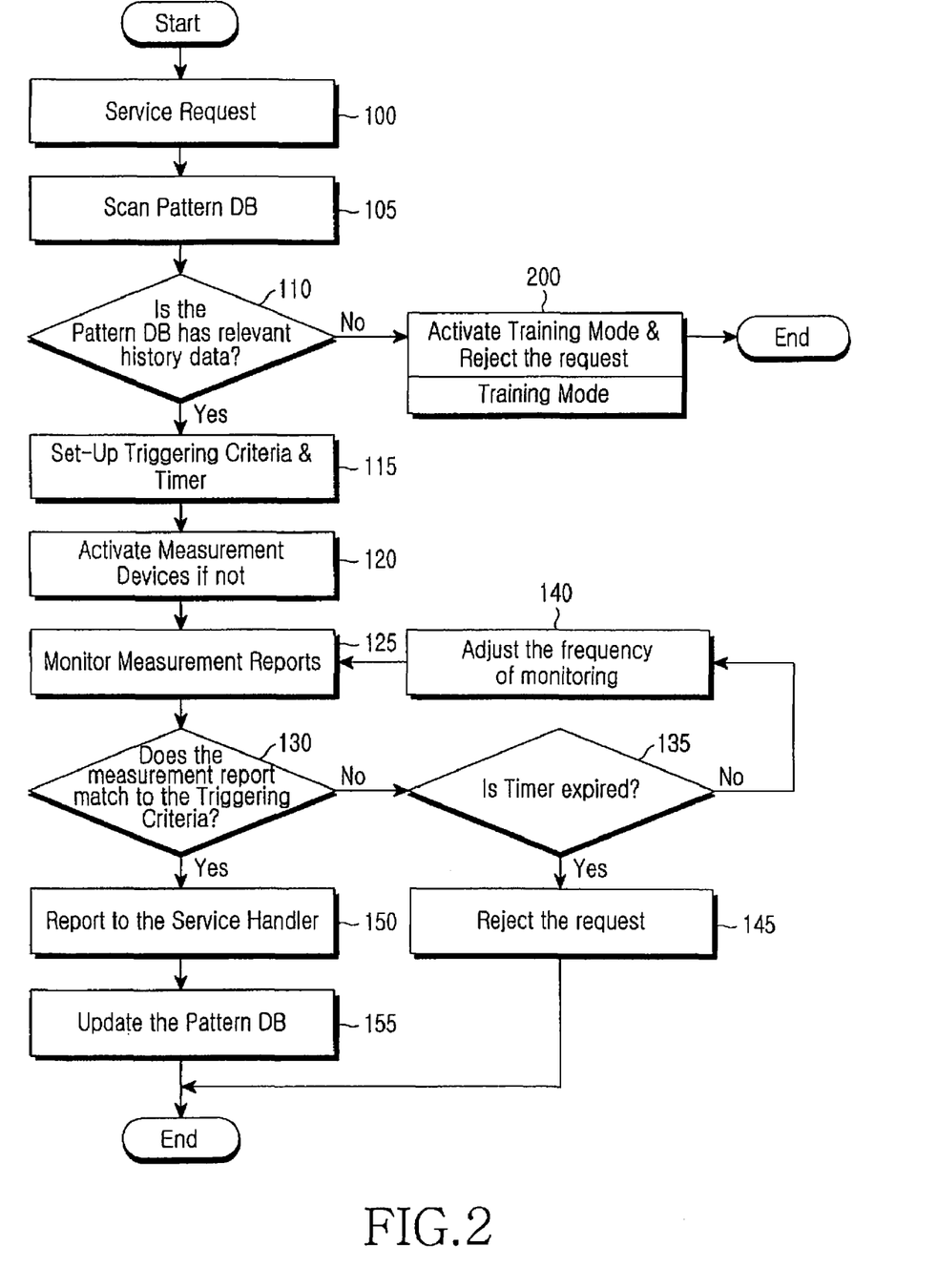
FIG. 2 is flow chart illustrating an embodiment of the present invention.

FIG. 2 is a flowchart illustrating an operation process of a system according to an embodiment of the present invention. Referring to FIG. 2, the system according to an embodiment of the present invention is initiated by an operation of the service handler (35).

The application sends a request for the service to the service handler (35) and the service handler (35) determines if it is capable of handling the request. If capable, the service handler (35) delivers the requested trigger to the application when the criteria are satisfied. Such criteria are exchanged between the application processor (40) and the service handler (35). In other words, in the "Service Request" step, step 100, a user defines triggering criteria and the action to be performed when those triggering criteria are met. The system then scans the pattern database (33) to determine if it stores any data relevant to the specified criteria in a step 105, i.e. does the pattern DB (33) contain data enabling the triggering request to be implemented. If the pattern DB (33) does not, the system proceeds to activate a training mode (step 200). If the stored data enables the request to be met, the triggering criteria and a timer are set (step 115).

Next, the system activates the measurement part (20) in step 120. The pattern matching unit (31) monitors a measurement report from the measurement part (20) in step 125, and determines if the measurement report satisfies triggering criteria in step 130. If the measurement report does not satisfy the triggering criteria, it is determined in step 135 if the set timer has expired. If the timer has expired, the service request is rejected in step 145 and the operation is terminated. On the other hand, if the timer has not expired in step 125, the frequency of monitoring is adjusted in step 140 and operations are repeated from step 125. If the measurement report satisfies the triggering criteria in step 130, the pattern matching unit (31) reports this fact to the service handler (35) in step 150 and updates information of the pattern DB (33) in step 155.

In the service request step, step 110, at least one criterion among location and time should be sent to the service handler (35) to arrange the service. Examples are provided in Table 2.

TABLE 2

| Type | Sub-Type | Parameters |
| --- | --- | --- |
| Location | Zone | Home, Office, Car Park, Supermarket, Indoor, Outdoor, or User-Defined |
| | Zone Edge | Yes/No |
| Time & Date | Date Band | Weekdays, Weekends, or User-Defined |
| | Time Band | Hour:Min:Sec(start)-Hour:Min:Sec(end) |
| Credibility | | High, Mid(default), Low |

After the service execution, the service handler (35) can ask the user or the application processor (40) about the credibility. When the user or the application is not satisfied with the result, the system can ask the user for manual training or adjust its pattern DB (33).

The training step, step 200, according to an embodiment of the present invention, may be performed based on a mechanism described below.

Figure 3:
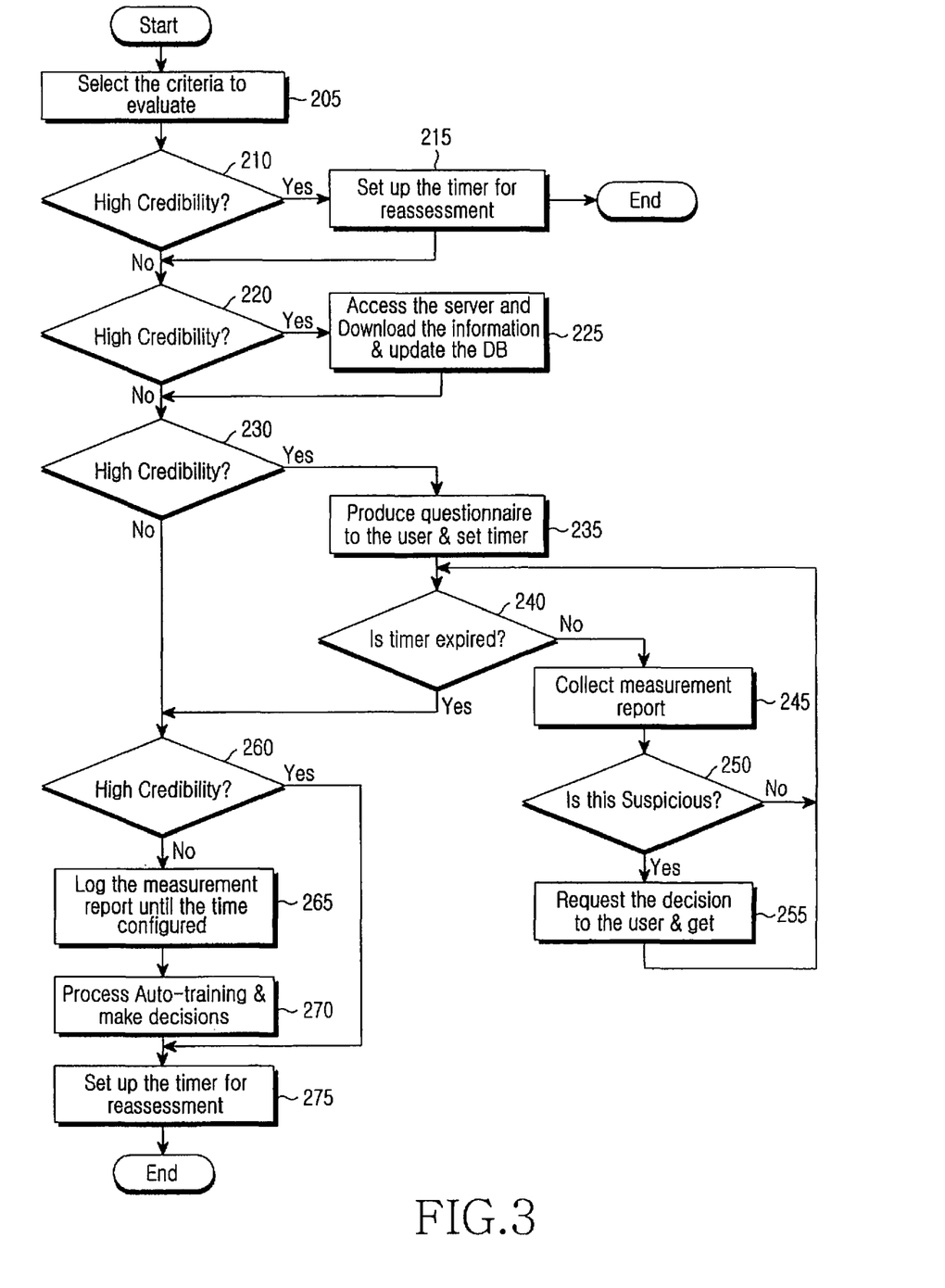
FIG. 3 is a flow chart illustrating an embodiment of the present invention.

There are 3 sub-modes in the training: server download, user manual training and automatic training. These modes are illustrated in FIG. 3. The server can produce typical information or specific information. User manual training mode collects the user's preferences and whenever a likely criteria happens, the system requests confirmation from the user if this instant criteria is what the user wants for a triggering event. The automatic training mode is where the preferences are pre-configured by the system and the system requests a confirmation based on likely criteria. However, because of the built-in reassessment timer, the system occasionally re-evaluates all of the credibility of the information parsed and stored and arranges training or updating.

For example, referring to FIG. 3, the training step, step 200, according to an embodiment of the present invention includes server download in steps 205-225, user manual training in steps 230-255, and automatic training in steps 260-275. More specifically, the server may generate a general information file or detailed information. Thus, the system selects criteria for evaluation in step 205, and determines if the selected criteria have high credibility in step 210. If the criteria have a high credibility, the timer for reassesment is set in step 215. On the other hand, if the criteria do not have high credibility, the system proceeds to step 220.

In step 220, the system determines if it can access the server, and if the system can access the server, the system accesses the server to download information and update the pattern DB (33) in step 225.

If the system cannot access the server, the system determines whether to perform manual training in step 230. If the system wants to perform manual training, the system produces a questionnaire such as current position, function to be used, and signal pattern to be used to be provided to the user and sets the timer in step 235. The system determines if the timer has expired in step 240. If the timer has expired, the system proceeds to step 260, and if the timer has not expired the system proceeds to step 245. In step 245, the system collects measurement report information and determines if the measurement report information is suspicious (i.e. not reliable) in step 250. For example, the measurement report information may be a signal or a pattern measured with respect to the questionnaire provided to a user. If it is, the system requests a confirmation from the user and replies to a response to the request in step 255, and then repeats step 240. If the measurement report information is not suspicious, the system immediately proceeds to step 240.

In step 260, the system determines whether to perform automatic training. If the system wants to perform automatic training, the system proceeds to step 265. If the system does not want to perform automatic training, the system proceeds to step 275 for setting the timer for reassessment. In step 265, the system logs the measurement report (21) until the set time has expired, and performs auto-training and decision-making in step 270. The system then proceeds to step 275 where the timer is set for reassessment, and then ends the process.

The triggering criteria may be set based on the following scenario.

Table 3 lists examples of typical scenarios of interest, along with information regarding characteristics of signal property patterns associated with those scenarios and information regarding how to detect and decide the triggering point (in effect, what pattern to look for in order to trigger action etc.). The first 4 scenarios are general cases, while the others are for more specific scenarios.

TABLE 3

| Location Domain | Time Domain | Major Signal Pattern Characteristic | Other Criteria to consider |
| --- | --- | --- | --- |
| Indoor | NA | Low GSM RSSI If WLAN detected, strong signal power Low GPS dBm (−160) | Previous measurements should showed the evidence of Outdoor if previous measurement exists |
| Outdoor | NA | High GSM RSSI If WLAN detected, low signal power High GPS dBm (−140) | Previous measurements should showed the evidence of Indoor if previous measurement exists |
| Entering into a building | NA | Sequential signal variation from Outdoor to Indoor | NA |
| Leaving a building | NA | Sequential signal variation from Indoor to Outdoor | NA |
| Home | Repeats Night | Low GSM RSSI If WLAN detected, strong signal power Low GPS dBm (−160) | Does it match with the BSIC (neighbor cell list) or SSID? |
| Leaving home | Repeats Morning | Sequential signal variation from Indoor to Outdoor | Does it match with the BSIC (neighbor cell list) or SSID? |
| Moving in home | Repeats Evening or afternoon | Sequential signal variation from Outdoor to Indoor | Does it match with the BSIC (neighbor cell list) or SSID? |
| Office | Repeats Weekday 9am-5pm | Low GSM RSSI If WLAN detected, strong signal power Low GPS dBm (−160) | Does it match with the BSIC (neighbor cell list) or SSID? |
| Entering the office | Repeats Weekday Morning | Sequential signal variation from Outdoor to Indoor | Does it match with the BSIC (neighbor cell list) or SSID? |
| Leaving Office | Repeats Weekday Afternoon | Sequential signal variation from Indoor to Outdoor | Does it match with the BSIC (neighbor cell list) or SSID? |
| Visited Supermarket | Occasional 9 am-11 pm (once a week) | Low GSM RSSI If WLAN detected, strong signal power Low GPS dBm (−160) | Does it match with the BSIC (neighbor cell list) or SSID? Double-check with the map and the user route tracking |
| Visited Car Park (Open Sky) | NA | High GSM RSSI If WLAN detected, low signal power High GPS dBm (−140) | Does it match with the BSIC (neighbor cell list) or SSID? Double-check with the map and the user route tracking |
| Visited Car Park (Basement) | NA | Low GSM RSSI If WLAN detected, strong signal power Low GPS dBm (−160) | Does it match with the BSIC(neighbor cell list) or SSID? Double-check with the map and the user route tracking |
| Car | NA | High GPS dBm (−140) | Double-check with the map and the user route tracking |

These patterns can also be used for automatic training in addition to the triggering decision-making.

Of course, the user can define other scenarios by manual configurations. To enhance the accuracy of detection or decision-making, more parameters can be added for assessments.

After setting up the triggering criteria and the timer, the system proceeds to activate measurement devices if they have not already been activated. These devices are used to monitor received signal properties. They produce measurement reports (data). In the next step, the measurement reports are monitored, and then a determination is made as to whether the triggering criteria have been met, that is, has the defined pattern been observed. If the criteria have not been met, a determination is made as to whether the timer has expired, that is, has a predetermined time elapsed. If not, the frequency of monitoring may be adjusted, and monitoring continues. If the timer has expired the request is rejected. If the measurement report indicates that the triggering criteria have been met, this is reported to the service handler (35) for appropriate action (e.g. as defined by the user in the initial request) and the pattern database may be updated.

With regard to applications, methods embodying the invention may, for example, be used as follows:

2D Alarm or Reminder System: certain prior art alarm or task reminder applications relied solely on time triggering. For example, providing an alarm in accordance with an instruction such as "wake me up at 6 AM except for on Saturday & Sunday". By adding location information, alarm or reminder systems embodying the invention can provide more sophisticated arrangements. Examples of alarms/reminder scenarios which may be implemented by embodiments of the invention are:

Remind me when I leaving the home for the office in the morning (bills to pay, meeting schedule of the day, people to call while driving);

Remind me when I approach the super market on weekends (shopping list); and/or

Activate the default wake-up alarm only when I was sleeping at home and weekdays.

Automatic Position Tracking functions may be provided by methods and systems embodying the invention. For example:

Employee Time Punching: when the user enters in the office, this can be determined from patterns in the monitored RF signals and a trigger event may be sent to a server to record the arrival time and the departure time of the employee;

GPS Power Saving in 24 hour/7 days tracking: The system can be configured to operate the built-in GPS only in outdoor locations by monitoring the UMTS or GSM signal strength, which is given by the request from the cellular network. Rather than operating solely on the occasional measurement of the GPS alone, this system can provide more effective way of understanding the environment where the mobile is located.

Advertisement: The operator or sales promoter can provide customized advertisement to the user by knowing the user situation or position. For example, the mobile device may determine (i.e. determine from patterns in received signal properties or contained information) that the user is at home, and can report that fact to a server. In that case, a service provider may then send a home-goods advertisement to the UE. This may require an agreement between the service provider and the user in advance.

Embodiments also provide the ability to perform automatic profile or configuration changes:

Automatic and Optimal Bearer Selection: Certain prior art systems today require the user's manual selection of bearer selection between WLAN-VoIP and UMTS Voice Call. In contrast, a system embodying the invention can inform the UE what is the most appropriate bearer to select (based on the observed signal property pattern(s)).

Embodiments may provide advantages in the field of Home Automation: In certain embodiments all phone information may be displayed on a TV screen while the user is watching the TV. As soon as the person enters into the home with WLAN AP active, the system detects this from the associated pattern of received signal properties, and automatically turns its profile to home and activates the TV via WLAN.

Examples of possible applications of embodiments of the invention therefore include:

Applications:

1) Alarm or Reminder Applications that combine timing and location information (derived from received signal patterns) for triggering purposes;

2) Employee Time Punching Applications;

3) GPS power Saving using GSM/UMTS/WLAN signal measurements; and/or

4) Automatic profile switching at home for a joint service with a TV.

Examples of possible system implementations embodying the invention include:

1) Methods that extract radio signal patterns to build user location profiles—GSM/UMTS : Layer 3 Link Measurement Report, Neighbor Cell RSSI Measurements; WLAN: SSID & Signal Power; and/or GPS & AGPS: Number of SV, Acquisition Sensitivity in dBm;

2) Automatic training mode to accumulate user location profiles; and/or

3) Triggering methods by pattern matching in time-domain and in radio signal pattern.

While the invention has been shown and described with reference to a certain preferred embodiment thereof, it will be understood by those having ordinary skill in the art that various changes in form and detail may be made therein without departing from the spirit and scope of the invention as defined by the appended claims.

What is claimed is:

1. A method of using radio signals transmitted for reception by mobile User Equipment (UE), the method comprising:
   receiving, by the mobile UE, radio signals having at least one format;
   monitoring, by the mobile UE, at least one property of the received radio signals;
   identifying a pattern in said at least one property; and
   in response to identifying said pattern, performing at least one of:
   triggering at least one action according to the identified pattern; and
   providing the mobile UE with a location of the mobile UE based at least in part on the identified pattern.

2. The method of claim 1, wherein the received radio signals comprise radio signals transmitted from at least one transmitter located at a terrestrial location.

3. The method of claim 1, wherein the received radio signals comprise signals transmitted from at least one Space Vehicle (SV).

4. The method of claim 1, wherein said pattern comprises at least one of a temporal pattern, a chronological pattern, a static pattern, an instantaneous pattern, and a dynamic pattern.

5. The method of claim 1, wherein said pattern comprises a change in at least one monitored property of at least one received radio signal.

6. The method of claim 1, wherein said pattern comprises an instantaneous combination of monitored properties of a plurality of different received radio signals.

7. The method of claim 1, wherein said at least one property comprises a received signal strength or power of a received radio signal.

8. The method of claim 1, wherein the at least one property comprises at least one of a Block Error Rate (BLER), a Bit Error Rate (BER), a Received Signal Strength Indicator (RSSI), a Common PIlot Channel Received Signal Code Power (CPICH RSCP), and a Space Vehicle (SV) power.

9. The method of claim 1, further comprising monitoring, by the mobile UE, information contained in the received radio signals.

10. The method of claim 9, wherein said identified pattern comprises a pattern in said information.

11. The method of claim 10, wherein said information comprises at least one of a neighboring cell ID list, a Base Station Identity Code (BSIC), a Subscriber Trunk Dialing (STD) code or region or area code, a Service Set IDentifier (SSID), a time and/or a date, a Global Positioning System (GPS) time of week, and a multipath indication.

12. The method of claim 1, wherein said identifying comprises processing results of said monitoring into a data format and comparing the results in said format with data stored in a memory.

13. The method of claim 12, further comprising using said results in said format to update the data.

14. The method of claim 1, wherein said action comprises at least one of:
    providing from the mobile UE a signal for a user of the mobile UE;
    changing a configuration of the mobile UE or of an external apparatus;
    switching the mobile UE between different operational modes; and
    switching at least one apparatus external to the mobile UE between different operational modes.

15. An apparatus for using radio signals transmitted for reception by mobile User Equipment (UE), the apparatus comprising:
    a mobile UE for receiving radio signals having at least one format and monitoring at least one property of the radio signals;
    a pattern identifier for identifying a pattern in said at least one property; and
    a response processor for performing, in response to the pattern identification means identifying said pattern, at least one of:
        triggering at least one action according to the identified pattern; and
        providing the mobile UE with a location of the mobile UE based at least in part on the identified pattern.

16. A mobile User Equipment (UE) for using radio signals transmitted for reception by the mobile UE, the mobile UE comprising:
    a receiver for receiving radio signals having at least one format;
    a monitoring part for monitoring at least one property of the radio signals; and
    a pattern identifier for identifying a pattern in said at least one property,
    wherein the mobile UE is arranged to respond to the pattern identifier identifying said pattern by performing at least one of:
        triggering at least one action according to the identified pattern; and
        providing a location of the UE based at least in part on the identified pattern.

* * * * *